US008314584B2

(12) United States Patent
Breuning et al.

(10) Patent No.: US 8,314,584 B2
(45) Date of Patent: Nov. 20, 2012

(54) MOTOR ARRANGEMENT WITH AN ELECTRONIC ISOLATING RELAY MODULE

(75) Inventors: Christian Breuning, Nuertingen (DE); Eckart Geinitz, Pfullingen (DE); Georg Voegele, Reutlingen (DE); Adolf Dillmann, Muensingen (DE)

(73) Assignee: Robert Bosch GmbH, Stuttgart (DE)

( * ) Notice: Subject to any disclaimer, the term of this patent is extended or adjusted under 35 U.S.C. 154(b) by 353 days.

(21) Appl. No.: 12/599,204

(22) PCT Filed: Mar. 19, 2008

(86) PCT No.: PCT/EP2008/053298
§ 371 (c)(1),
(2), (4) Date: Nov. 6, 2009

(87) PCT Pub. No.: WO2008/135309
PCT Pub. Date: Nov. 13, 2008

(65) Prior Publication Data
US 2010/0301713 A1 Dec. 2, 2010

(30) Foreign Application Priority Data
May 8, 2007 (DE) .......................... 10 2007 021 491

(51) Int. Cl.
*H02H 3/13* (2006.01)
(52) U.S. Cl. ........................................ 318/491; 318/434

(58) Field of Classification Search ................... 318/434, 318/490, 491
See application file for complete search history.

(56) References Cited

U.S. PATENT DOCUMENTS

| | | | | | |
|---|---|---|---|---|---|
| 3,903,456 | A | * | 9/1975 | Schaefer | 361/24 |
| 4,603,269 | A | * | 7/1986 | Hochstein | 327/432 |
| 5,138,177 | A | * | 8/1992 | Morgan et al. | 250/551 |
| 5,220,197 | A | * | 6/1993 | Schovanec | 257/712 |
| 6,639,502 | B2 | * | 10/2003 | Herrick | 337/102 |
| 2007/0030606 | A1 | | 2/2007 | Ganev et al. | |

FOREIGN PATENT DOCUMENTS

| | | |
|---|---|---|
| EP | 0 561 587 | 9/1993 |
| EP | 0 591 587 | 4/1994 |
| JP | 2000-500102 | 11/2000 |
| JP | 2006-3200066 | 11/2006 |
| WO | WO 94/10971 | 5/1994 |
| WO | WO 98/10971 | 3/1998 |
| WO | WO 01/65666 | 9/2001 |
| WO | WO 03/099632 | 12/2003 |

* cited by examiner

*Primary Examiner* — Bentsu Ro
(74) *Attorney, Agent, or Firm* — Merchant & Gould P.C.

(57) ABSTRACT

The invention relates to a motor arrangement, in particular for use in an electronic steering system, comprising a polyphase motor (1) in a motor housing (10); a housing element (14), which forms a part of the motor housing (10); an electronic isolating relay module (2, 40) in order to switch one or more motor phases such that their current does not flow in the event of a fault; wherein the isolating relay module (2, 40) is arranged in the housing interior on one side of the housing element (14).

11 Claims, 3 Drawing Sheets

MOTOR ARRANGEMENT WITH AN ELECTRONIC ISOLATING RELAY MODULE

This application is a National Stage Application of PCT/EP2008/053298, filed 19 Mar. 2008, which claims benefit of Serial No. 10 2007 021 491.1, filed 8 May 2007 in Germany and which applications are incorporated herein by reference. To the extent appropriate, a claim of priority is made to each of the above disclosed applications.

BACKGROUND

The invention relates to a motor arrangement, in particular a servo drive for an electronic steering system, wherein provision is made for an isolating relay module to switch one or more motor phases such that its/their current does not flow.

In the case of servo drives, in particular in electronic steering systems, which, for example, have a synchronous motor, the danger of said systems locking exists in the event of a short circuit in the motor phases so that the motor vehicle could become unsteerable in the aforementioned example. The reason for this lies in the fact that in the event of a short circuit, the motor operates in the generator mode so that a driver of the vehicle has to work against the generator's torque in addition to the entire steering forces on the steering axle.

In the case of a synchronous motor, the motor phases are frequently connected up in a star connection. In order to keep the generator from operating in the event of a short circuit in a phase, provision can be made for a mechanically or electronically configured star-point relay, which in the case of a fault separates the motor phases from each other at the neutral point.

A typical deficiency of mechanical relays is their lack of reliability due to mechanical fatigue, respectively locked up mechanical components, whereby the reliability in separating the motor phases is curtailed.

An increase in the reliability is made possible by the use of electronic relays. In order that said relay can also be used with difficult surrounding conditions, it has to be connected to the motor system in a suitable manner. Furthermore, the power transistors used in electronic star-point relays have a heat build-up during normal operation, which makes a suitable design necessary to assure the dissipation of the heat. For that reason, a suitable structural-design technology and connection method are required.

SUMMARY

It is therefore the task of the present invention to make a motor system available, in particular for use in an electronic steering system, wherein an electronic star-point relay is integrated in an advantageous manner, can be connected with low resistance to the motor phases and is arranged in a particularly space saving manner so that its reliability and failsafe performance continue to be increased.

According to one aspect, provision is made for a motor arrangement particularly for use in an electronic steering system. The motor arrangement comprises a polyphase motor in a motor housing, a housing element, which forms a part of the motor housing, as well as an electronic isolating relay module in order to switch one or more motor phases such that their current does not flow in the event of a fault. The isolating relay module is arranged in the housing interior on one side of the housing element.

Provision is made in the motor arrangement for an electronic isolating relay module for switching off the motor phase strands to be arranged in such a way that a particularly compact motor arrangement is implemented, which is particularly suited for use in an electronic steering system. In so doing, the isolating relay module is arranged in the housing interior on one side of the housing element so that the isolating relay module obtains a suitable heat abstraction from the housing element as well being protected from environmental influences by the motor housing.

In addition the isolating relay module can be arranged on a printed circuit board, in particular a ceramic printed circuit board, which is arranged on an elevated section, which is configured on a surface of the housing element which faces the housing interior.

According to one embodiment, the isolating relay module is configured as a star-point relay module or as a phase isolating relay module.

Provision can be made for a contact-guide element, which is to be non-conducting with respect to a through conductor and which extends into a through opening of the housing element in order to establish contact between an inner and outer surface of the housing element.

The contact-guide element can additionally be configured with a journal, which at least partially extends along the side of the housing element and has a retaining element, in particular a nose, which acts in conjunction with a corresponding retaining element, in particular a recess, to hold the contact-guide element.

Provision can additionally be made for a control unit on an opposite side of the housing element in order to control the operation of the motor, in particular the operation of the isolating relay module.

According to one embodiment, the housing element is of planar design in order to cover a cylindrical housing part.

BRIEF DESCRIPTION OF THE DRAWINGS

Preferred embodiments of the invention are explained in detail below with the aid of the accompanying drawing. The following are shown.

DETAILED DESCRIPTION

Figure 1:
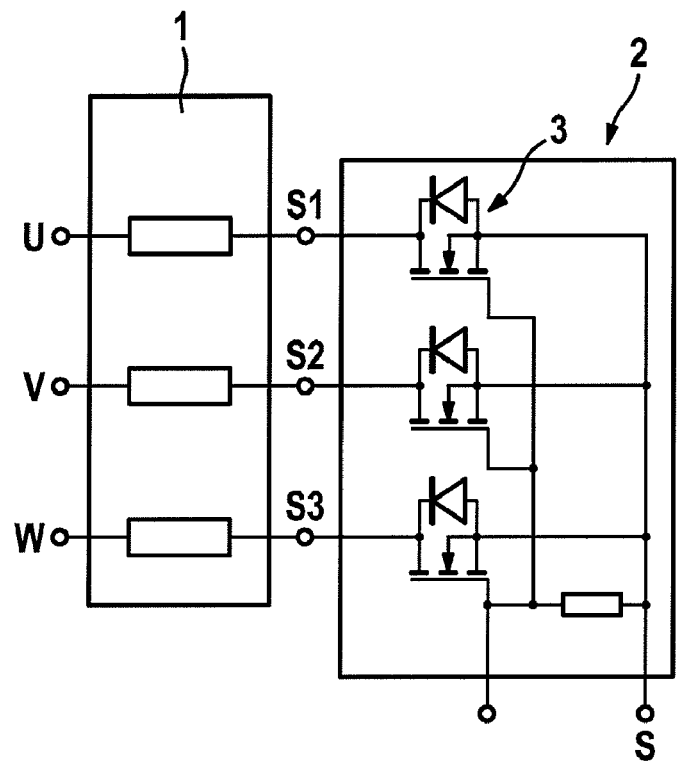
FIG. 1 is a circuit diagram of a motor arrangement with three phases, which are wired up in a star connection with a star-point relay.

FIG. 1 shows a circuit diagram, which depicts the circuitry between the motor phase strands U, V, W of a synchronous motor 1 with a star-point relay. Each of the motor phase strands U, V, W is connected to a neutral point S via a suitable circuit breaker 3, as for example a MOSFET. The circuit breakers are operated such that they are closed in the case of normal operation of the motor system so that the motor phase strands U, V, W are electrically connected to each other via the neutral point S.

In the event of a fault, for example when a short circuit occurs in one of the motor phase strands U, V, W or something similar, the circuit breakers are opened and the motor phase strands U, V, W are consequently separated from the neutral point S. The current flow is thereby immediately interrupted in the motor phase strands and a braking torque of the synchronous motor, respectively a generator torque, can be avoided because the motor phase strands are switched such that their current does not flow immediately with the opening of the circuit breaker 3. The switching of the circuit breakers 3 is performed in a control cable with the aid of an activation signal, said cable being connected to their gate terminals in a configuration with MOSFETs.

Figure 2:
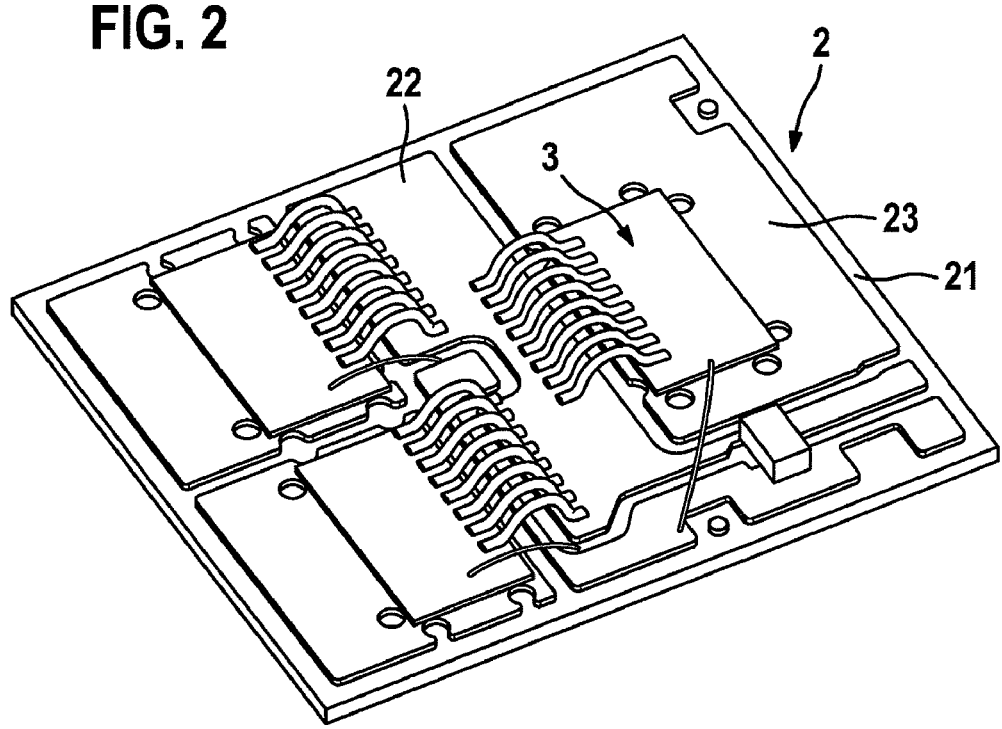
FIG. 2 is a perspective view of a star-point relay module for use in a motor arrangement according to one embodiment of the invention.

In FIG. 2, an embodiment of a star-point relay module 2 is shown in a perspective depiction. The star-point relay module 2 comprises a ceramic substrate as a carrier plate 21, whereupon circuit path structures are arranged as copper strip conductors 22. The copper strip conductors 22 form the terminals to the motor phase strands U, V, W of the synchronous motor 1. In addition, the neutral point S is configured as a conductor area on the ceramic substrate 21. Provision is made for additional copper surfaces on the carrier plate 21. The MOSFET 3 is arranged on said surfaces in such a way that the best possible heat abstraction from the MOSFET 3 to the copper surfaces is possible. The contacting of the MOSFETs 3 results at least partially from the surface of the carrier plate 21 which is opposite to the copper strip conductors 22.

Figure 3:
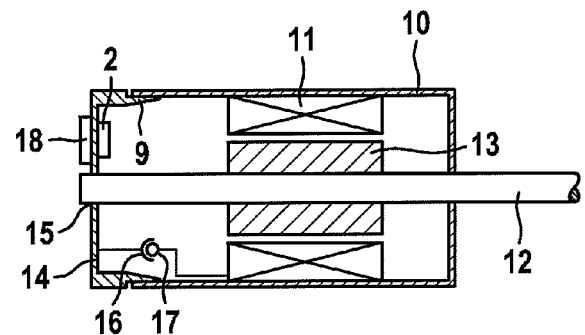
FIG. 3 is a cross section through a motor arrangement of a synchronous motor with an installed star-point relay according to the embodiment of the present invention.

A cross-sectional view of a motor arrangement is depicted in FIG. 3 according to one embodiment of the invention. The motor arrangement comprises a motor housing 10 which is configured as a cylindrical sheath, on whose circumferential surface motor coils are arranged in order to activate a motor axis 12 in a known manner by a suitable activation via the permanent rotor magnets 13 located thereupon. The motor axis 12 projects on one end of the motor housing 10 and serves as the motor output. At one end of the motor housing 10 opposite to the motor output side, provision is made for a discoidal housing element 14, with which the corresponding side of the sleeve-shaped motor housing 10 is closed. The housing element 14 has a circumferential insert edge 9, which is displaced inwards and protrudes substantially perpendicular to the main surface of the housing element 14, which is inserted into the interior of the motor housing 10, in order to position the housing element 14 at the motor housing 10. The housing element 14 has a central opening 15, through which an end of the motor axis 12 protrudes, which lies opposite to the output side. Said axis 12 is thereby supported in the central opening.

An inner surface of the housing element 14 aligned in the direction of the motor housing 10 is equipped with a phase strand terminal 16 which is connected to a corresponding second phase strand terminal 17, which in the assembled state is affixed in the motor housing 10 in order to allow for a contacting of the motor phase strands U, V, W from the outside via the housing element 14.

The star-point relay module 2 is arranged on the inner surface of the housing element 14, and it is therefore possible for it to have short connecting cables to the motor phase strands so that during normal operation, i.e. in the closed state of the circuit breakers 3, connections with as low resistance as possible, which are made between the motor phase strands via the neutral point S, can be implemented.

Provision is preferably made for a control unit 18, which performs the open-loop control of the synchronous motor, on the outer surface of the housing element 14 opposite to its inner surface. When using the motor arrangement in an electronic steering system, the control unit can additionally have the necessary functions for such a use.

Figure 4:
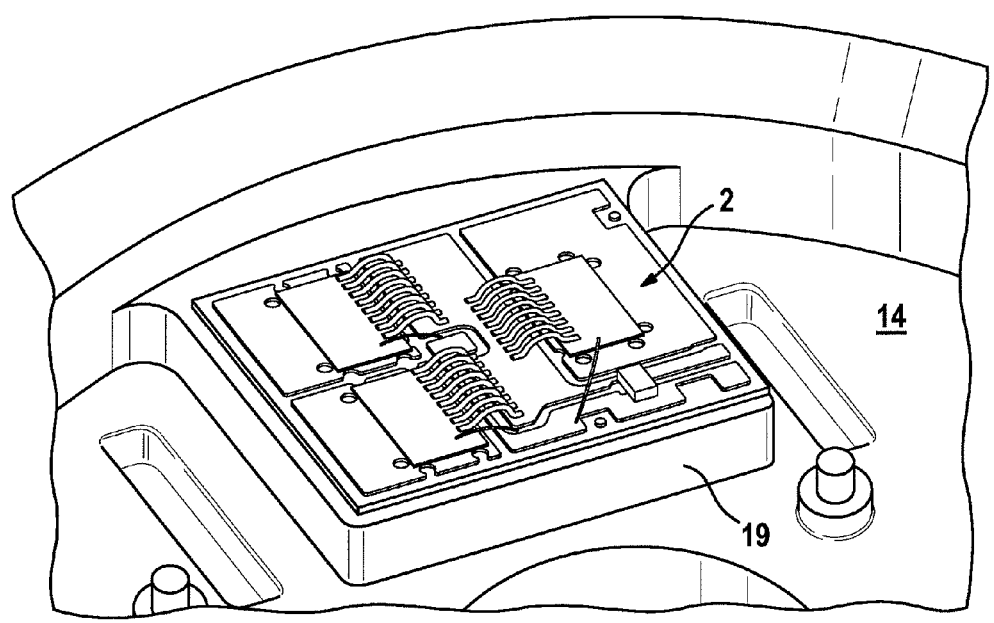
FIG. 4 is a perspective view of a cut-out of a housing element of the motor arrangement with the star-point relay module arranged thereupon according to one embodiment of the invention.

A cut-out of the housing element 14 is perspectively depicted in FIG. 4. It can thereby be seen that a star-point relay module 2 is arranged on a base plate 19 of the housing element 14. The base plate 19 extends from an inner surface of the housing element 14 into the motor interior and forms a surface, on which the star-point relay module 2 abuts. The base plate 19 and the housing element 14 are preferably configured as one piece and formed from a material which conducts heat well, for example a plastic material. The star-point relay module 2 is preferably glued to the base plate 19 of the housing element 14 or affixed with the aid of fixing elements. In the latter case, provision can be made for a heatsink paste between the base plate 19 and the housing element 14.

Figure 5:
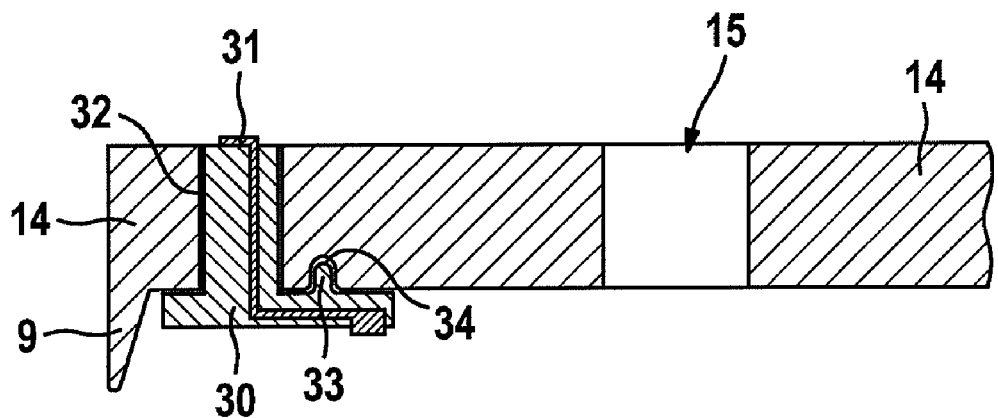
FIG. 5 is a cross section through a section of the housing element with a through-connection element for connecting the star-point relay module to a control unit for actuating the motor in the motor arrangement.

As is shown in the cut-out of the housing element in FIG. 5, the housing element 14 can have a through opening 32 for implementing the feedthrough for at least the control cable. A contact-guide element 30 is provided therein, which has a non-conductive plastic element or an element from another non-conductive material. A through conductor 31 is imbedded in the contact-guide element 30. The through conductor 31 can correspond to the control cable for activating the circuit breaker 31 and is connected to the star-point relay module 2 on the inner surface of the housing element 14 and to the control unit 18 on the outer surface of the housing element 14.

The contact-guide element 30 is configured substantially T-shaped and is put from the inner surface of the housing element 14 into the through opening such that the journals of the contact-guide element 30 abut on the inner surface of the housing element 14. A journal of the contact-guide element 30 has a nose, which engages in a recess 34 on the inner surface of the contact-guide element 30 in order to fix the same.

The invention is not limited to providing the star-point relay module 2 on the housing element 14, which is provided as a planar closure of the cylindrically shaped motor housing 10. In the case of other motor arrangements, the star-point relay module 2 can be arranged at almost any location within the motor housing as long as it does not impair the function of the motor. Additional housing components for the reliable accommodation of the star-point relay 2 can be forgone as a result of the arrangement of the star-point relay module 2 in, respectively on, the housing of the motor arrangement.

Figure 6:
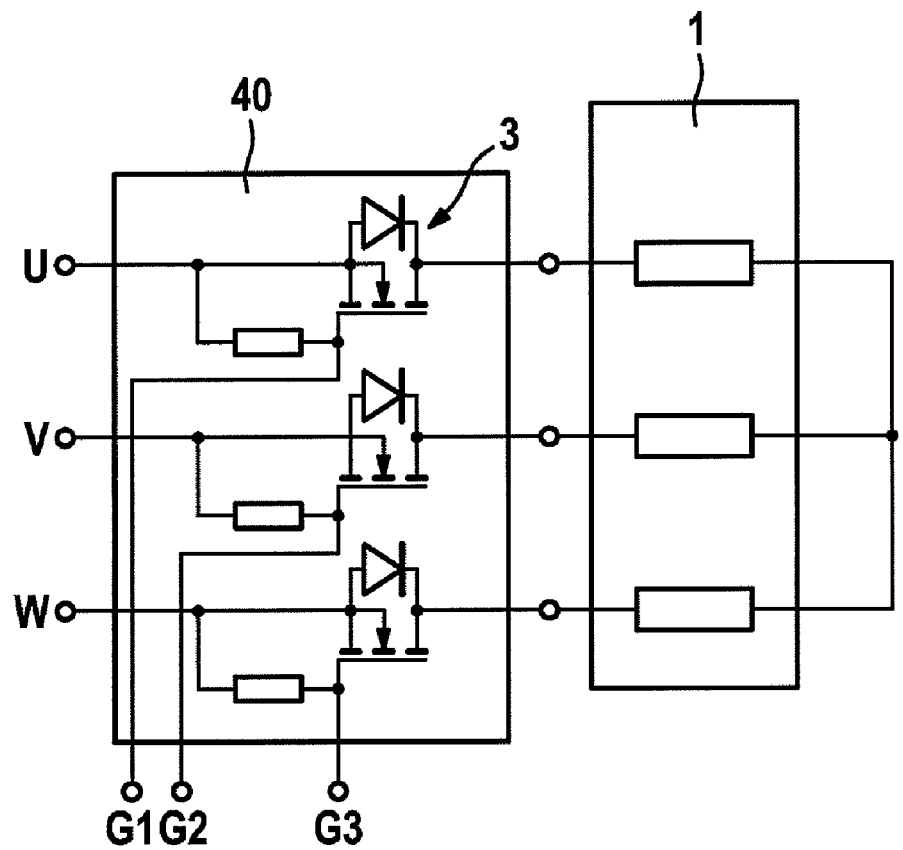
FIG. 6 is a schematic diagram of a motor arrangement with three phases, which are wired up in a star connection and can be switched by a phase isolating relay such that their current does not flow.

Instead of the star-point relay module 2, provision can also be made for an electronic phase isolating relay module 40 as is shown in FIG. 6. In this embodiment, the motor phase strands U, V, W of the synchronous motor 1 are connected to each other as a star connection. The respective circuit breakers 3 of the phase isolating relay module 40, which in the case of normal operation are closed, are arranged between the control unit 18 and the motor phase strands U, V, W. Each of the circuit breakers 3 is discretely activated with a control cable. In the event of a fault, the circuit breakers 3 are opened so that no current can flow anymore through the motor phase strands.

The invention claimed is:
1. A motor arrangement, in particular for use in an electronic steering system, comprising:
a motor housing;
a polyphase motor in the motor housing;

an electronic isolating relay module in order to switch one or more motor phases such that their current does not flow in the event of a fault; and a control unit, wherein the motor housing consists of a housing cover and the remaining housing part thereof and the isolating relay module is arranged on an interior side of the housing cover and the control unit is arranged on an exterior side of the housing cover, and in that said housing cover is provided with a through opening and a contact-guide element extends into the through opening, wherein the contact-guide element is non-electrically conductive and is provided with a through conductor and in that the through conductor connects the isolating relay module on the inside of said housing cover and the control unit on the outside of said housing cover to each other.

2. The motor arrangement according to claim 1, wherein the isolating relay module is arranged on a printed circuit board, in particular a ceramic printed circuit board, which is arranged on an elevated section, which is configured on a surface of the housing cover which is directed into the housing interior.

3. The motor arrangement according to claim 1 wherein the isolating relay module is configured as a star-point relay module or as a phase isolating relay module.

4. The motor arrangement according to claim 1, wherein the contact-guide element is configured having a journal, which at least partially extends along the side of the housing cover, and having a nose, which acts in conjunction with a corresponding a recess, in order to hold the contact-guide element.

5. The motor arrangement according to claim 1, wherein provision is made for the control unit in order to control the operation of the isolating relay module.

6. The motor arrangement according to claim 1, wherein the housing cover is of planar design in order to cover a cylindrically shaped housing part.

7. An electronic steering system having the motor arrangement according to claim 1.

8. The motor arrangement according to claim 1, characterized in that the isolating relay module and the control unit are arranged on the housing cover and the polyphase motor is arranged on the remaining housing part.

9. The motor arrangement according to claim 1, characterized in that the housing cover has an insert edge, which is inserted into the remaining housing part.

10. The motor arrangement according to claim 1, wherein the housing cover has a central opening and an end of a motor axis is supported in the central opening.

11. The motor arrangement according to claim 1, wherein provision is made for a first phase strand terminal on the inside of the housing cover and for a second phase strand terminal on the remaining housing part and when inserting the housing cover into the remaining housing part, the first phase strand terminal and the second phase strand terminal are connected in order to supply the motor phase strands with electrical current via said housing cover and said first phase strand terminal and said second phase strand terminal.

* * * * *